United States Patent [19]

Basu

[11] Patent Number: 5,781,573
[45] Date of Patent: Jul. 14, 1998

[54] HIGH POWER SOLID STATE LASER AND METHOD OF INCREASING POWER USING SAME

[75] Inventor: Santanu Basu, Rancho Palos Verdes, Calif.

[73] Assignee: Northrop Grumman Corporation, Los Angeles, Calif.

[21] Appl. No.: 760,546

[22] Filed: Dec. 5, 1996

[51] Int. Cl.⁶ .................................................... H01S 3/04
[52] U.S. Cl. ........................... 372/34; 372/39; 372/40; 372/36; 372/70; 372/71; 372/75; 372/98; 372/101
[58] Field of Search .................... 372/39, 40, 41, 372/36, 34, 70, 71, 92, 98, 101, 75

[56] References Cited

U.S. PATENT DOCUMENTS

| | | | |
|---|---|---|---|
| 3,753,145 | 8/1973 | Chesler | 331/94.5 |
| 3,942,880 | 3/1976 | Zeiders, Jr. | 350/310 |
| 4,233,567 | 11/1980 | Chernoch | 372/34 |
| 4,740,988 | 4/1988 | Knollenberg et al. | 372/99 |
| 4,756,002 | 7/1988 | Ruggieri et al. | 372/70 |
| 4,782,492 | 11/1988 | McMahon et al. | 372/34 |
| 4,933,946 | 6/1990 | Kuper et al. | 372/34 |
| 4,949,346 | 8/1990 | Kuper et al. | 372/36 |
| 4,969,155 | 11/1990 | Kahan | 372/70 |
| 5,020,070 | 5/1991 | Lombardo | 372/65 |
| 5,128,953 | 7/1992 | Macken | 372/58 |
| 5,181,214 | 1/1993 | Berger et al. | 372/34 |
| 5,202,893 | 4/1993 | Kubota et al. | 372/34 |
| 5,243,617 | 9/1993 | Pocholle et al. | 372/69 |
| 5,267,252 | 11/1993 | Amano | 372/34 |
| 5,295,144 | 3/1994 | Lawrenz-Stolz et al. | 372/22 |
| 5,299,213 | 3/1994 | Kuba et al. | 372/35 |
| 5,311,528 | 5/1994 | Fujino | 372/35 |
| 5,325,390 | 6/1994 | Tidwell | 372/71 |
| 5,335,245 | 8/1994 | Marie et al. | 372/103 |
| 5,381,427 | 1/1995 | Wedekind et al. | 372/19 |
| 5,386,427 | 1/1995 | Zayhowski | 372/34 |
| 5,430,756 | 7/1995 | Hanihara | 372/108 |

*Primary Examiner*—Brian Healy
*Attorney, Agent, or Firm*—Terry J. Anderson; Karl J. Hoch, Jr.

[57] ABSTRACT

A high power solid state laser has a solid state laser medium with two ends and a longitudinal axis, at least one laser diode configured to end pump the laser medium, a resonator in optical alignment with the laser medium, a transparent and thermally conductive end cap disposed at each end of the laser medium and in thermal communication therewith, and at least one heat sink in thermal communication with the end caps. The end caps and the heat sink(s) cooperate to effect heat flow from the laser medium such that a substantial component of the heat flow is along the longitudinal axis of the laser medium, thus mitigating undesirable transverse temperature gradients within the laser medium and enhancing average power output therefrom.

39 Claims, 1 Drawing Sheet

HIGH POWER SOLID STATE LASER AND METHOD OF INCREASING POWER USING SAME

FIELD OF THE INVENTION

The present invention relates generally to lasers and more particularly to a high power solid state laser wherein conductive cooling facilitates operation thereof at increased average output power.

BACKGROUND OF THE INVENTION

Solid state lasers which are stimulated into emission via end pumping are well known. Such end pumped solid state lasers are more efficient than their radially pumped counterparts, since the pumping radiation is more nearly in line with the output beam thereof. Such on-axis pumping inherently provides a high ratio of absorption/geometric cross-section of the pumped region and also potentially facilitates efficient overlap with low order spatial modes of the solid state laser.

According to contemporary construction, a solid state laser comprises a laser medium, typically comprised of a crystalline material such as Nd: YAG, aligned within a laser resonator, i.e., a pair of parallel mirrors, and configured to be end pumped via an external excitation laser beam so as to effect the generation of a laser beam within the laser medium, reflected between the two mirrors of the resonator. The laser beam so generated within the solid state laser medium is output through one or both of the mirrors of the resonator.

A longitudinal axis is defined along the length of the solid state laser medium, which is typically configured in the form of a rod. Transverse directions are defined radially with respect to the rod-shaped laser medium. The longitudinal axis generally defines the optical axis of the laser medium.

The laser medium is pumped from either one or both ends thereof, generally via laser diodes. The efficiency of such end pumped solid state lasers has led to the development of a number of important devices including the first actively mode-locked Nd-glass laser which is pumped by a 30-mW continuous wave diode laser and which emits 6-ps pulses. However, as those skilled in the art will appreciate, such end pumped solid state lasers suffer from substantially reduced efficiency due to transverse temperature gradients which occur within the solid state laser medium of contemporary devices.

The problems associated with heat dissipation become particularly apparent as the average output power from such devices is scaled up. As those skilled in the art will appreciate, such transverse temperature gradients contribute to undesirable focusing and depolarization of the laser beam within the solid state laser medium. Optimal average single-mode power is obtained by providing a single-mode geometrical cross-sectional area and overlapping the pumped beam to this area.

As those skilled in the art will appreciate, maximum efficiency, and therefore maximum output power, is attained when the excitation wavelength of the excitation laser beam, i.e., the output of the laser diode(s) are matched to the absorption wavelength or an absorption band of the solid state laser medium. Thus, if the excitation wavelength of the laser diode(s) is not equal to the absorption wavelength of the solid state laser medium, then the oscillation efficiency of the output laser beam is substantially degraded. As those skilled in the art will further appreciate, the absorption wavelength or absorption band of the solid state laser medium varies in proportion to the temperature thereof, especially in a three-level laser.

In an attempt to mitigate the problem of inefficiency associated with transverse thermal gradients, various convective cooling methodologies have been developed. According to each of such convective cooling methodologies, a liquid or gas is caused to flow along the faces of the solid state laser medium. However, although it has been found that such convective cooling does significantly increase the power handling capacity of the solid state laser medium, it does not tend to eliminate transverse thermal gradients. Therefore it does not provide optimal performance.

In a further attempt to increase the power handling capacity of the solid state laser medium, mechanical motion of the pumping radiation source relative to the solid state laser medium to effect regeneration thereof has been performed. According to such contemporary methodology, the pumping source is typically moved along the length of the solid state laser medium, so as to mitigate overheating of any particular portion thereof. However, as those skilled in the art will appreciate, such mechanical motion of the pumping source relative to the solid state laser medium only enhances temperature gradients within the medium, and thus, like convective cooling, does not result in optimal power handling capability of the solid state laser medium.

As such, it is highly desirable to maintain the temperature of the solid state laser medium such that it is uniform throughout and does not vary substantially over time during operation thereof.

SUMMARY OF THE INVENTION

The present invention specifically addresses and alleviates the above-mentioned deficiencies associated with the prior art. More particularly, the present invention comprises a high-powered solid state laser comprising a solid state laser medium having two ends and a longitudinal axis thereof. At least one laser diode is configured to end pump the laser medium. A resonator is in optical alignment with the solid state laser medium. A transparent and thermally conductive end cap is disposed at each end of the laser medium and in thermal communication therewith. According to the preferred embodiment of the present invention, at least one heat sink is in thermal communication with each of the end caps. Optionally, the end caps are configured so as to comprise the heat sinks, thus eliminating the need for separate heat sinks.

According to the preferred embodiment of the present invention the thermally conductive end caps contact the ends of the laser medium in a manner which provides uniform and efficient heat transfer across the interface therebetween. As those skilled in the art will appreciate, various means of achieving such uniform and efficient heat transfer are suitable. For example, the contacting surfaces may be ground or otherwise finished so as to provide a sufficiently smooth surface to facilitate such uniform and efficient heat transfer. Additionally, various transparent heat conducting compounds may be disposed intermediate the thermally conductive end caps and the ends of the laser medium so as to facilitate such uniform and efficient heat conduction.

The end caps and the heat sinks cooperate to effect heat flow from the laser medium such that a substantial component of the heat flow is along the longitudinal axis of the laser medium. Thus, undesirable transverse temperature gradients within the laser medium are mitigated and the average output power thereof is enhanced.

The laser medium is preferably generally configured as a rod, thus defining a longitudinal axis and a plurality of transverse or radial axes. Those skilled in the art will appreciate that various other configurations of the laser medium are likewise suitable. Discussion in this patent application and depiction in the drawings thereof of the laser medium as a rod are thus by way of illustration only, and not by way of limitation.

The laser diode(s) preferably comprise two laser diodes, each of the two laser diodes pump the laser medium from a different end thereof.

The high power solid state laser preferably further comprises a focusing lens disposed intermediate each laser diode and the laser medium. The focusing lenses focus the output of each laser diode upon their respective ends of the laser medium.

According to the preferred embodiment of the present invention, the resonator comprises two solid state laser mirrors, one solid state laser mirror is disposed proximate each end of the laser medium, preferably off-axis and at an angle with respect thereto. Preferably, one of the two solid state laser mirrors is configured so as to facilitate transmission of the laser radiation generated within the solid state laser medium therethrough, so as to provide the output beam of the high powered solid state laser of the present invention. Optionally, both of the solid state laser mirrors may be so configured, thus providing two separate output beams from the solid state laser medium.

The thermally conductive end caps are preferably attached to the laser medium, preferably via optical bonding. The end caps are preferably comprised of undoped yttrium aluminum garnet (YAG).

According to the preferred embodiment of the present invention, the heat sink(s) comprise a common heat sink in thermal communication with both end caps. Thus, a single structure functions as a heat sink for both ends of the solid state laser medium.

Optionally, one of the laser diodes is attached directly to one of the end caps. In this instance, the laser diode so attached to the end cap is preferably configured so as to function as a heat sink for the laser medium. Further, when one of the laser diodes is attached directly to one of the end caps, then the resonator preferably comprises a mirror formed upon the surface of the laser medium intermediate the laser medium and the laser diode attached directly thereto.

Preferably, the laser medium is sufficiently short in length such that only one axial mode is under a gain curve thereof at any given time for a given temperature. Preferably, the diameter of the laser medium is matched to the solid state laser resonate mode thereof. Optionally, the laser medium comprises a non-linear optical laser medium.

Optionally, a temperature controller is configured to control the temperature of the end caps and/or the heat sink(s), so as to maintain the solid state laser medium within a desired range of temperatures.

Optionally, an intracavity is disposed intermediate the laser medium and at least one of the end caps. Optionally, a harmonic laser medium is disposed intermediate the laser medium and at least one of the end caps. Optionally, an optical isolator is attached to one of the end caps.

The maximum temperature rise which is related to the fracture of the material increases with increasing absorption and decreases with increasing thermal conductivity of the laser material. The transverse or radial temperature gradient may further be diminished by tailoring the thermal boundary condition on the rod cylindrical surface, for example, by changing the insulation or heat flow boundary conditions thereof. The geometry of the present invention is not limited to that of a rod-shape. In fact, a rectangular parallelepiped can be fitted with rectangular end caps for even better thermal properties of the laser or the non-linear optical converter.

Thus, according to the present invention, the average output power of an end pumped solid state laser is increased by conductively cooling a solid state laser medium of the two ends thereof. Thus, the step of conductive cooling the laser medium comprises the steps of physically constraining heat flux within the laser medium to have a major component thereof along a longitudinal axis of the laser medium and removing heat from the laser medium at at least one end thereof. Physically constraining heat flux within the laser medium to have a major component thereof along a longitudinal axis minimizes the angle between the pumping of the laser medium and the heat flux therethrough, so as to mitigate undesirable focusing and depolarization of the laser radiation generated thereby.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENTS

Figure 1:
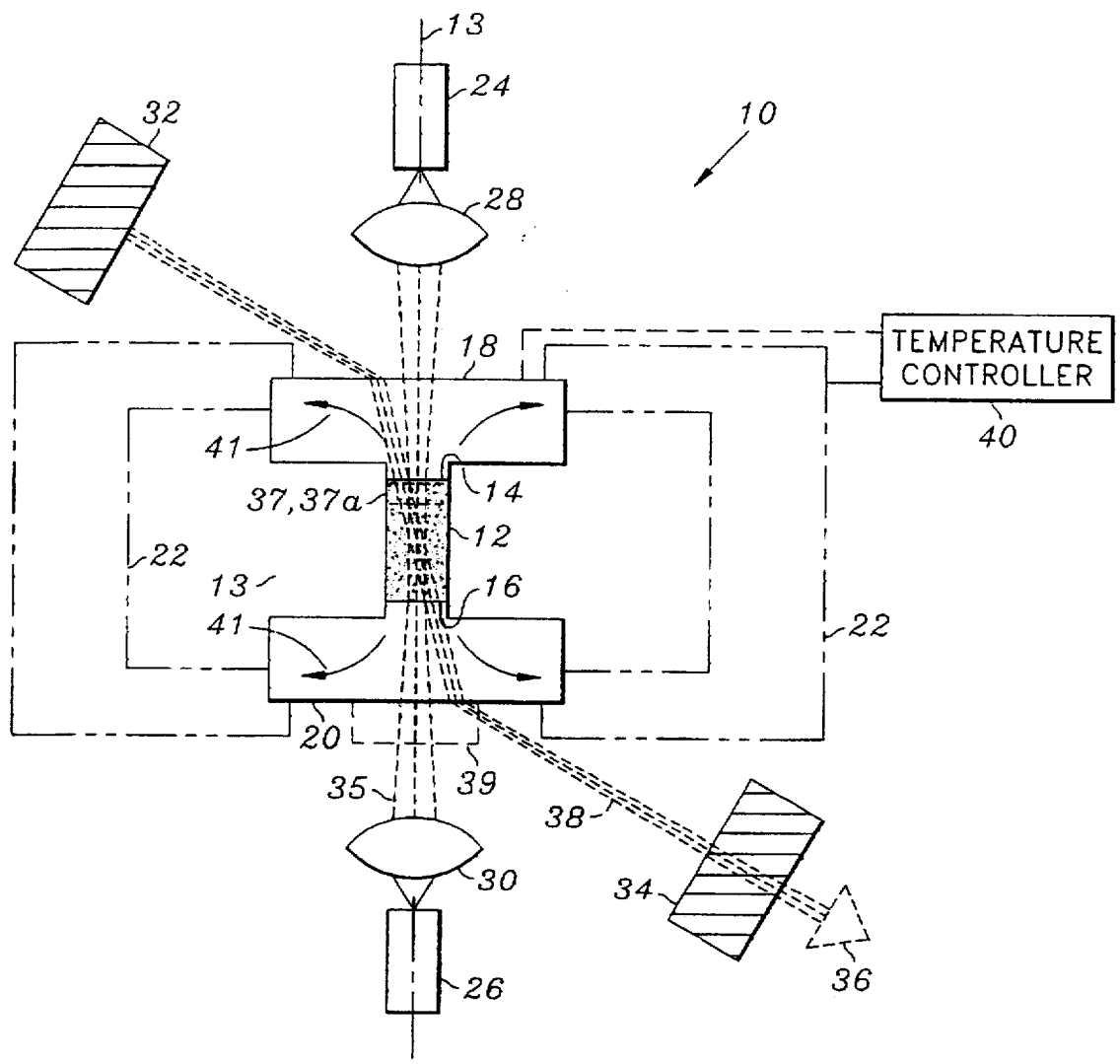
FIG. 1 is a schematic representation of the high power solid state laser of the present invention.

The detailed description set forth below in connection with the appended drawings is intended as description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The high power solid state laser of the present invention is illustrated in FIG. 1, which depicts a presently preferred embodiment thereof. Referring now to FIG. 1, the high power solid state laser 10 generally comprises a solid state laser crystal or medium 12, which, according to the present invention, is configured as a rod. However, as those skilled in the art will appreciate, various other configurations, i.e., rectangular, elongate hexagonal, elongate octagonal, etc., are likewise suitable. The laser medium 12 has a longitudinal axis 13 extending along the length thereof and a plurality of radial or transverse axes extending sideways therethrough. An exemplary transverse axis 13 of the laser medium 12 is shown in FIG. 1. The solid state laser medium further comprises first 14 and second 16 ends thereof.

Proximate the first end 14 of the solid state laser medium 12 and in thermal communication therewith is first end cap 18. Similarly, proximate the second end 16 of the solid state laser medium 12 and in thermal communication therewith is the second end cap 20.

According to the preferred embodiment of the present invention, the first 18 and second 20 end caps are attached to, preferably optically bonded to, the first 14 and second 16 ends of the solid state laser medium 12. Physical contact between each end cap 18, 20 and its associated end 14, 16 of the laser medium 12 is maximized so as to assure desirable heat flow through the interfaces thereof. Thus, abutting surfaces of the end caps 14, 16 are preferably sufficiently smooth to assure such contact. Further, according to the preferred embodiment of the present invention, the end caps 18, 20 only contact the laser medium 12 at the typically parallel surfaces at the ends 14, 16 of the laser medium 12, so as to assure that a major component of the heat flux is in the longitudinal direction of the laser medium 12. Thus, heat generated within the solid state laser medium 12 is readily transferred to the first 18 and second 20 end caps substantially along the longitudinal axis of the solid state laser medium 12 such that transverse temperature gradients are mitigated within the solid state laser medium 12.

Further, according to the preferred embodiment of the present invention, the laser medium 12 is supported only by the end caps 18, 20, such that conductive heat flow through the laser medium 12 is constrained along the longitudinal axis 13 thereof. As those skilled in the art will appreciate, additional support structures contacting the laser medium 12 along the length thereof will provide additional paths for heat flux from the laser medium 12, thereby causing transverse heat gradients. By supporting the laser medium 12 solely at the ends 14, 16 thereof, such transverse thermal gradients are eliminated.

A heat sink 22, which may either be a single, common heat sink for both end caps 18 and 20 or may be two or any other number of heat sinks therefore, dissipates heat from the end caps 18 and 20, preferably by radiating heat therefrom into the air. Optionally, the end caps 18, 20 may comprise, or be integrally formed with, the heat sinks 22. That is, the end caps 18, 20 and the heat sinks 22 may optionally form single, integrated structures.

First 24 and second 26 laser diodes pump the solid state laser medium 12, preferably via first 28 and second 30 focusing lenses, respectively. Optionally, one of the laser diodes 24, 26 may be attached directly to the end cap 18 or 20, thus eliminating its associated focusing lens 28, 30.

Thus, the first 24 and second 26 laser diodes and the first 28 and second 30 focusing lenses form a pumping or first optical path 35 through the solid state laser medium 12.

A resonator facilitates oscillation of laser radiation within the solid state laser medium 12. The resonator preferably comprises first 32 and second 34 solid state laser mirrors, at least one solid state laser mirror (34 as shown) of which is configured so as to facilitate the transmission of laser radiation therethrough so as to provide output beam 36.

Thus, first 32 and second 34 solid state mirrors define a resonator or second optical path 38 through the solid state laser medium 12. As those skilled in the art will appreciate, the pumping or first optical path 35 and the second or resonant optical path 38 are approximately co-linear, so as to enhance the pumping efficiency of the solid state laser.

Optionally, one of the solid state laser mirrors 32, 34 may be formed directly upon its associated end 14, 16 of the laser medium 12. One of the solid state mirrors 32, 34 may be formed directly upon its associated end 14, 16 of the laser medium 12 when, for example, the laser diode 24, 26 at that end of the laser medium 12 is attached directly to the laser medium 12 without the use of an end cap 18, 20.

Thus, in operation according to the present invention, heat generated within the solid state laser medium 12 due to the pumping thereof via first 24 and second 26 laser diodes and due to the stimulated emission of laser radiation therein, is efficiently conducted away from the solid state laser medium 12 in a manner which minimizes undesirable transverse thermal gradients therein. In this manner, the occurrence of undesirable focusing and depolarization of the stimulated laser radiation is minimized, thus providing increased average power output.

As those skilled in the art will appreciate, according to the present invention the heat flux through the solid state laser medium 12 is physically constrained to have a major component along the longitudinal axis 13 of the solid state laser medium 12. That component of the heat flux which is orthogonal to the longitudinal axis 13 of the solid state laser medium 12, i.e., along a radial or transverse axis of the solid state laser medium 12, is consequently minimized. Heat flow from the laser medium 12 via the ends 14, 16 thereof into the end caps 18, 20 is shown as arrows 41.

Optionally, the solid state laser medium 12 comprises a non-linear optical laser medium.

Optionally, a temperature controller 40 is utilized to maintain a desired temperature of either the end caps 18, 20 or the heat sink(s) 22. Preferably, closed-loop control of the temperature controller 40 is utilized to maintain the desired temperature.

Optionally, an intracavity 37 is disposed intermediate the solid state laser medium 12 and at least one of the end caps 18, 20. Optionally, the intracavity 37 contains a harmonic laser medium 37a. Optionally, an optical isolator 39 is attached to one of the end caps 18, 20.

It is understood that the exemplary high powered solid state laser described herein and shown in the drawings represents only a presently preferred embodiment of the present invention. Indeed, various modifications and additions may be made to such embodiment without departing from the spirit and scope of the invention. For example, those skilled in the art will appreciate the various different configurations of the solid state laser medium 12 are suitable for use in the present invention. For example, the solid state laser medium 12 may have a round, square, triangular, hexagonal, octagonal, or any other desired cross-sectional configuration. Thus, the solid state laser medium 12 may comprise a parallelepiped rather than a rod. Additionally, various different configurations of the heat sink 22 are contemplated. Further, although conductive cooling is utilized to remove heat directly from the solid state laser medium 12, convection cooling may be utilized to remove heat from either the end caps 18, 20 or the heat sink 22, as desired. Thus, these and other modifications and additions may be obvious to those skilled in the art may be implemented to adapt the present invention for use in a variety of different applications.

What is claimed is:

1. A high power solid state laser, said laser comprising:
   a) a solid state laser medium having two ends and a longitudinal axis extending between the two ends;
   b) at least one laser diode configured to end pump the laser medium;
   c) a resonator in optical alignment with the laser medium;
   d) a transparent and thermally conductive end cap disposed at each end of the laser medium and in thermal communication therewith; and
   e) at least one heat sink in thermal communication with the end caps;

f) wherein the end caps and the heat sink(s) cooperate to effect heat flow from the laser medium such that a substantial component of the heat flow is along the longitudinal axis of the laser medium, thus mitigating undesirable transverse temperature gradients within the laser medium and enhancing average power output therefrom.

2. The high power solid state laser as recited in claim 1 wherein said laser medium is generally configured as a rod.

3. The high power solid state laser as recited in claim 1 wherein the laser diode(s) comprises two laser diodes, each of the two laser diodes pumping the laser medium from a different end thereof.

4. The high power solid state laser as recited in claim 1 further comprising a focusing lens disposed intermediate each laser diode and the laser medium for focusing an output of each laser diode onto the laser medium.

5. The high power solid state laser as recited in claim 1 wherein the resonator comprises two solid state laser mirrors, one solid state mirror being disposed proximate each end of the laser medium.

6. The high power solid state laser as recited in claim 1 wherein the end caps are attached to the laser medium.

7. The high power solid state laser as recited in claim 1 wherein the end caps are optically bonded to the laser medium.

8. The high power solid state laser as recited in claim 1 wherein the end caps are comprised of undoped YAG.

9. The high power solid state laser as recited in claim 1 wherein the heat sink(s) comprise a common heat sink in thermal communication with both end caps.

10. The high power solid state laser as recited in claim 1 wherein one laser diode is attached directly to one of the end caps.

11. The high power solid state laser as recited in claim 1 wherein one laser diode is attached directly to one of the end caps and the attached laser diode is configured to function as a heat sink for the laser medium.

12. The high power solid state laser as recited in claim 1 wherein one laser diode is attached directly to one of the end caps and the resonator comprises a mirror formed on a surface of the laser medium intermediate the laser medium and the laser diode attached directly thereto.

13. The high power solid state laser as recited in claim 1 wherein the laser medium is sufficiently short in length that only one axial mode is under a gain curve thereof at any given time for a given temperature.

14. The high power solid state laser as recited in claim 1 wherein a diameter of the laser medium is matched to a solid state laser resonate mode thereof.

15. The high power solid state laser as recited in claim 1 wherein the laser medium comprises a nonlinear optical laser medium.

16. The high power solid state laser as recited in claim 1 further comprising a temperature controller configured to control a temperature of the end cap(s).

17. The high power solid state laser as recited in claim 1 further comprising at least one intracavity disposed intermediate the laser medium and at least one of the end caps.

18. The high power solid state laser as recited in claim 1 further comprising a harmonic laser medium disposed intermediate the laser medium and at least one of the end caps.

19. The high power solid state laser as recited in claim 1 further comprising an optical isolator attached to one of the end caps.

20. A method for increasing average output power of an end pumped solid state laser, said method comprising the steps of:

a) conductively cooling a solid state laser medium, the step of conductively cooling the laser medium comprising the steps of:
  i) physically constraining heat flux within the laser medium to have a major component thereof along a longitudinal axis of the laser medium;
  ii) removing heat from the laser medium at at least one end thereof;
b) wherein physically constraining heat flux within the laser medium to have a major component thereof along a longitudinal axis minimizes an angle between pumping of the laser medium and heat flux therethrough so as to mitigate focusing and depolarization of laser radiation generated thereby.

21. A method for increasing the average output power of a high power solid state laser, the method comprising the steps of:
a) providing a solid state laser medium having two ends and a longitudinal axis;
b) configuring at least one laser diode to end pump the laser medium;
c) optically aligning a resonator with the solid state laser medium;
d) disposing a transparent and thermally conductive end cap at each end of the laser medium and in thermal communication therewith; and
e) placing at least one heat sink in thermal communication with the end caps;
f) wherein the end caps and the heat sink(s) cooperate to effect heat flow from the laser medium such that a substantial component of the heat flow is along the longitudinal axis of the laser medium, thus mitigating undesirable transverse temperature gradients within the laser medium and enhancing average output power therefrom.

22. The method as recited in claim 21 wherein the step of providing a solid state laser medium comprises providing a solid state laser medium generally configured as a rod.

23. The method as recited in claim 21 wherein the step of configuring a laser diode to end pump the laser medium comprises configuring two laser diodes to end pump the laser medium from two opposite ends thereof.

24. The method as recited in claim 21 wherein the step of configuring at least one laser diode to end pump the laser medium comprises focusing the output of each laser diode onto the laser medium.

25. The method as recited in claim 21 wherein the step of optically aligning a resonator with the solid state laser medium comprises optically aligning two solid state laser mirrors with the laser medium, one solid state mirror being disposed proximate each end of the laser medium.

26. The method as recited in claim 21 wherein the step of disposing end caps at each end of the laser medium comprises attaching the end cap thereto.

27. The method as recited in claim 21 wherein the step of disposing end caps at each end of the laser medium comprises optically bonding the end caps thereto.

28. The method as recited in claim 21 wherein the step of disposing end caps at each end of the laser medium comprises disposing end caps comprised of undoped YAG at each end of the laser medium.

29. The method as recited in claim 21 wherein the step of placing the heat sink(s) in thermal communication with the end caps comprises placing a common heat sink in thermal communication with both end caps.

30. The method as recited in claim 21 wherein the step of disposing an end cap at each end of the laser medium comprises attaching an end cap directly to the laser diode.

31. The method as recited in claim 21 wherein the step of providing a solid state laser medium comprises providing a solid state laser medium having a sufficiently short length that only one axial mode is under a gain curve thereof at any given time for a given temperature.

32. The method as recited in claim 21 wherein the step of providing a solid state laser medium comprises providing a solid state laser medium having a diameter thereof matched to a solid state laser resonant mode thereof.

33. The method as recited in claim 21 wherein the step of providing a solid state laser medium comprises providing a non-linear optical solid state laser medium.

34. The method as recited in claim 21 wherein the step of disposing a thermally conductive end cap at each end of the laser medium comprises directly attaching one of the end caps to one laser diode, the laser diode being configured to function as a heat sink for the laser medium.

35. The method as recited in claim 21 wherein one laser diode is attached directly to at least one of the end caps and the resonator comprises a mirror formed on a surface of the laser medium intermediate the laser medium and the laser diode attached directly thereto.

36. The method as recited in claim 21 further comprising the step of controlling a temperature of at least one of the end caps via a temperature controller.

37. The method as recited in claim 21 further comprising the step of providing an intracavity disposed intermediate the laser medium and at least one of the end caps.

38. The method as recited in claim 21 further comprising the step of providing a harmonic laser medium disposed intermediate the laser medium and at least one of the end caps.

39. The method as recited in claim 21 further comprising the step of providing an optical isolator attached to one of the end caps.

* * * * *